N. IVERSON.
REVOLVING HARROW.
APPLICATION FILED FEB. 2, 1912.
1,053,095.
Patented Feb. 11, 1913.
3 SHEETS—SHEET 1.
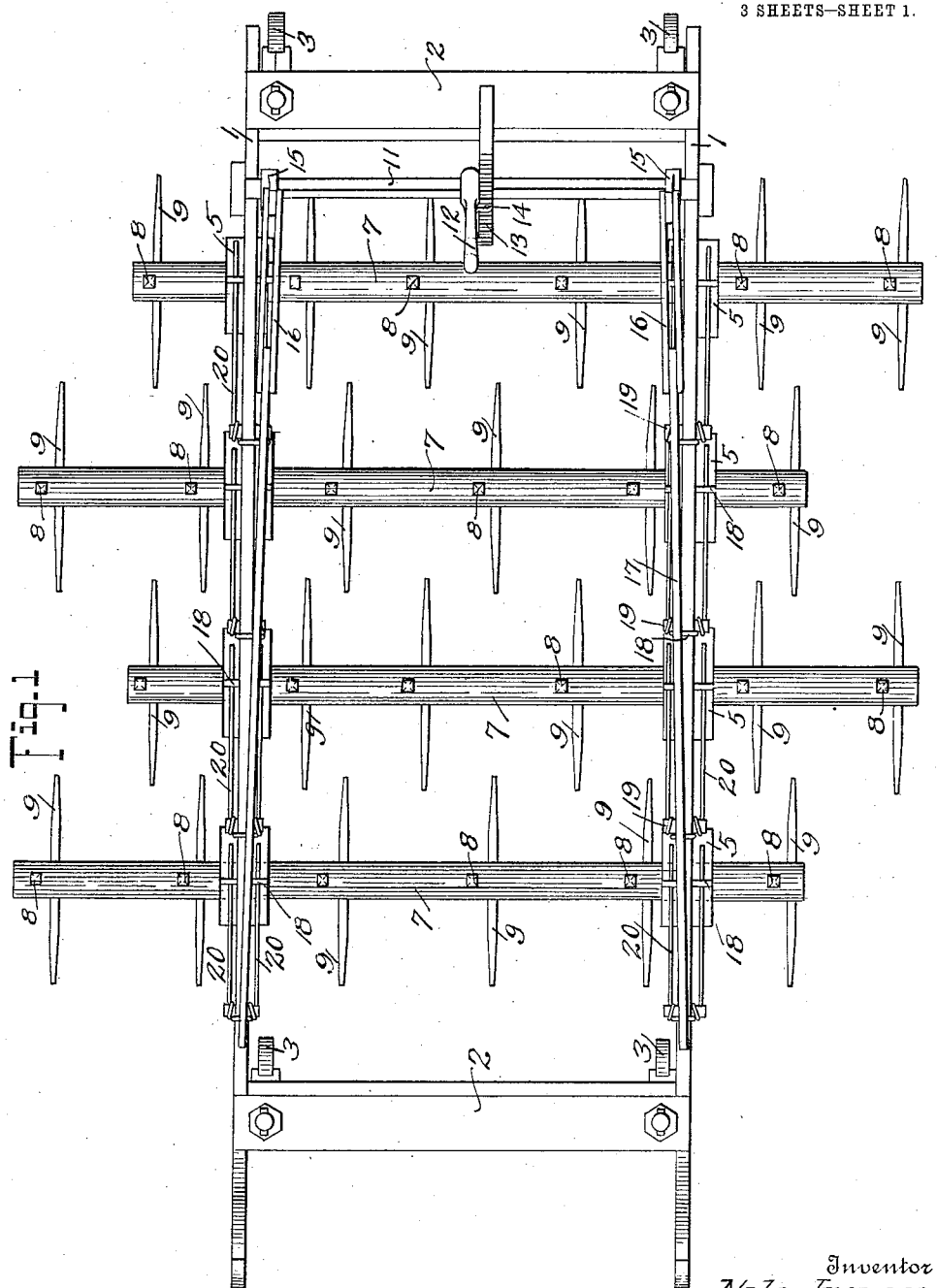
Witnesses
E. H. Wagner.
G. W. Kirkley
Inventor
Nils Iverson
By
J. T. Robb
Attorney

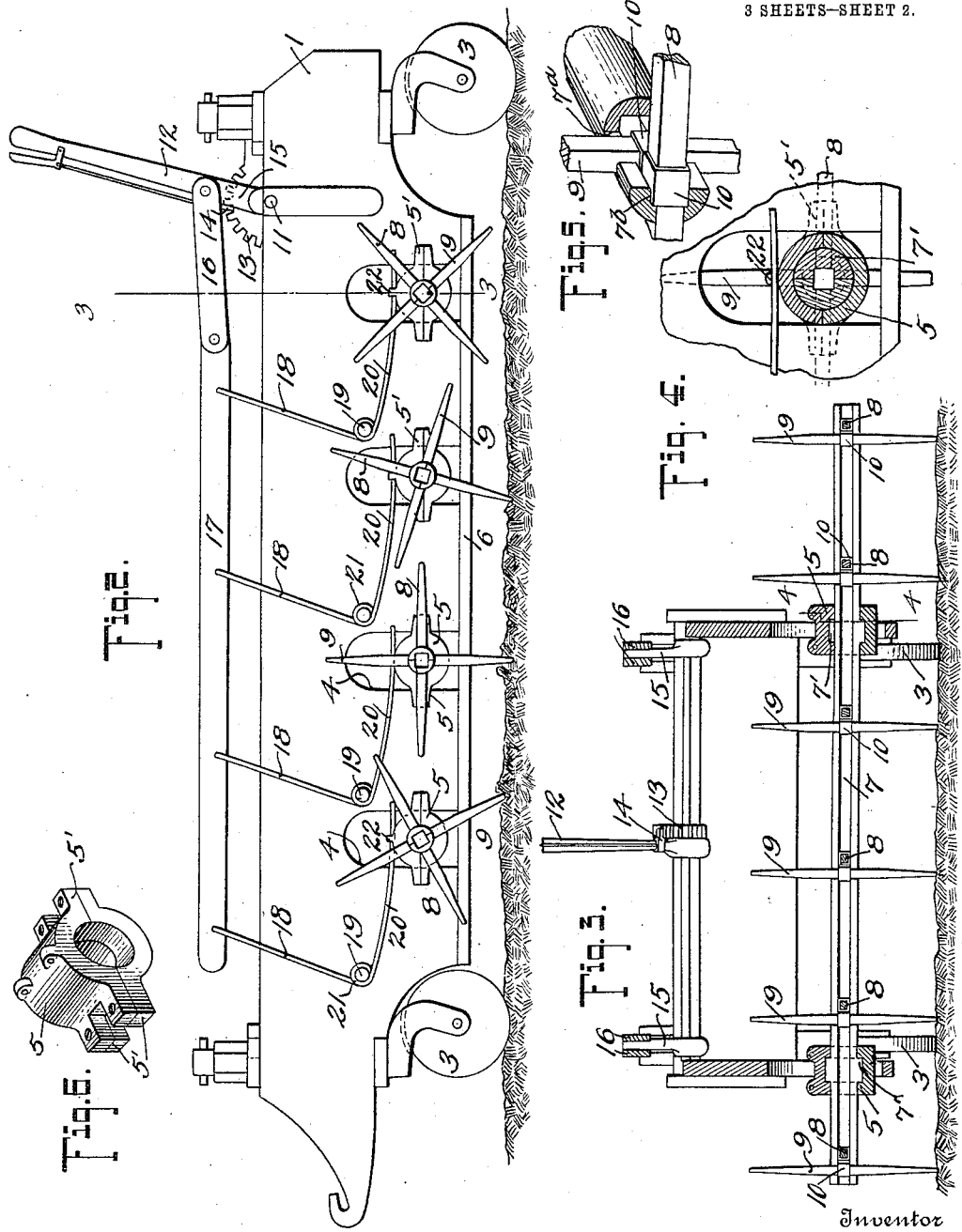

N. IVERSON.
REVOLVING HARROW.
APPLICATION FILED FEB. 2, 1912.
1,053,095.
Patented Feb. 11, 1913.
3 SHEETS—SHEET 3.
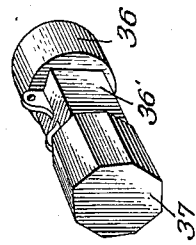
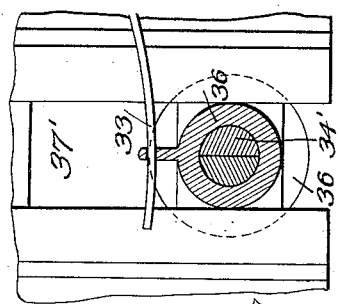
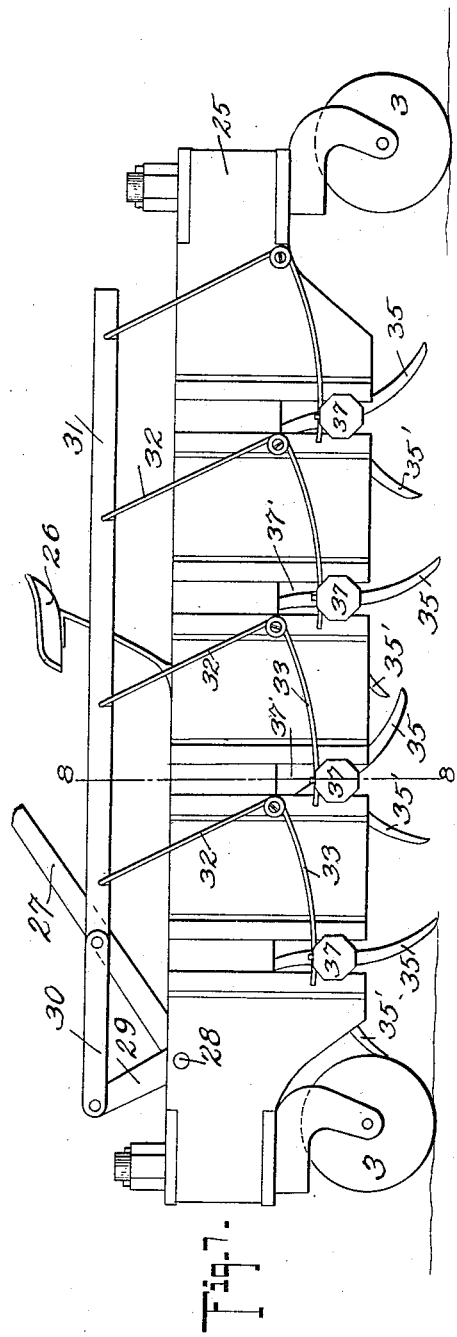
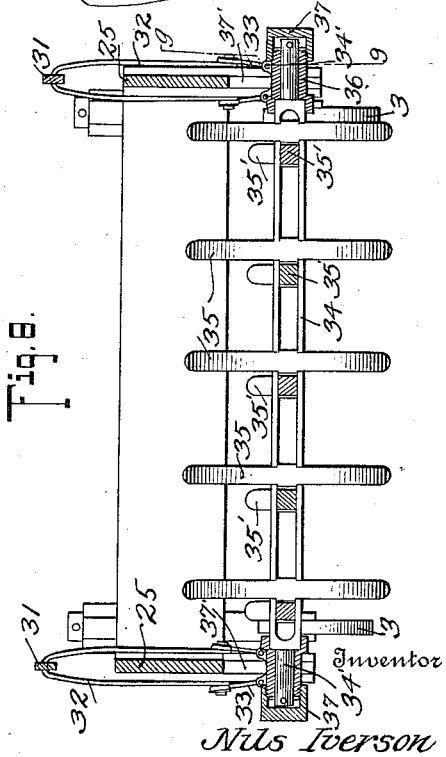
Witnesses
C. H. Wagner
G. W. Kirkley
Inventor
Nils Iverson
By
J. W. Robb Attorney

UNITED STATES PATENT OFFICE.

NILS IVERSON, OF BIGTIMBER, MONTANA.

REVOLVING HARROW.

1,053,095.  Specification of Letters Patent.  Patented Feb. 11, 1913.

Application filed February 2, 1912. Serial No. 675,082.

*To all whom it may concern:*

Be it known that I, NILS IVERSON, a citizen of the United States, residing at Bigtimber, in the county of Sweet Grass and State of Montana, have invented certain new and useful Improvements in Revolving Harrows, of which the following is a specification.

This invention appertains to that type of harrows wherein are employed toothed members capable of being revolved in operating upon the soil for reducing or breaking up the latter.

The objects of the invention are to produce an implement of the above type wherein the revolving toothed members are yieldably supported upon the frame carrying the same so that they may give or yield when they strike obstructions, to eliminate likelihood of the teeth becoming damaged or broken; to employ certain adjusting means for varying the degree of yieldability of the revolving toothed members; also to provide a peculiar construction of the toothed members whereby the latter are advantageously assembled to provide a rigid and substantial arrangement of parts; and to employ a peculiar form of bearing for shafts constituting parts of the toothed members, whereby the latter are properly held from longitudinal movement or displacement with respect to the frame of the machine.

With the above and other objects in view, a full comprehension of the operation and construction of the invention will be obtained by reference to the following description and accompanying drawings, in which—

Figure 1 is a top plan view of a harrow embodying the essential features of the invention. Fig. 2 is a side elevation. Fig. 3 is a section taken about on the line 3—3 of Fig. 2. Fig. 4 is a fragmentary sectional view taken on the line 4—4 of Fig. 3. Fig. 5 is a detail fragmentary view showing more clearly how the teeth are mounted in the sectional shafts. Fig. 6 is a detail perspective view of one of the shaft boxes. Fig. 7 is a side elevation of a modification. Fig. 8 is a transverse section on the line 8—8 of Fig. 7. Fig. 9 is a sectional view taken about on the line 9—9 of Fig. 8. Fig. 10 is a detail perspective view of the journal box used in the adaptation of the invention illustrated by Figs. 7 to 9.

Throughout the following detail description and on the several figures of the drawings, similar parts are referred to by like reference characters.

Referring particularly to the construction illustrated in Figs. 1 to 6 inclusive, 1 denotes the frame of the harrow, which is preferably composed of spaced sides connected by the ends 2. Suitably journaled in the ends 2 of the frame are the caster wheels 3 which facilitate the movement of the implement when the toothed members are not adjusted to operate upon the soil, or as they are operated thereover.

The frame 1 is illustrated conventionally and may be made of any suitable general construction, the sides being formed with the vertical elongated bearings 4 in which are mounted split boxes 5. A plate 6 closes the lower ends of the bearings 4 and prevents unauthorized displacement of the boxes 5 therefrom.

As shown most clearly in Fig. 3 of the drawings, the revolving toothed members of the harrow each comprise a sectional shaft 7, the latter passing through the boxes 5 and being, of course, journaled therein. The sections of the shaft 7 are of semi-circular form in cross section preferably and are cut away upon their inner sides so that when the sections are assembled, the shaft is hollow. Each shaft is formed at suitable distances from its ends with annular shoulders 7' which fit into annular grooves provided in the boxes 5, the latter being also of sectional or split form so that the sections may be readily fitted by the shaft 7 at the shoulder portions 7' so as to properly engage with the latter. The boxes 5 are also provided at their opposite ends with the guiding and positioning lugs 5' which fit against adjacent opposite side portions of each side of the frame 1 and thus prevent lateral displacement of the box from the bearings 4 in which they are adapted to slide. Longitudinal movement of the shaft 7, when mounted in its pair of boxes 5 of the frame 1 is prevented by the interlocking connection established by the shoulders 7' and internal grooves of the box. Each section of the shaft 7 is provided with notches 7ª and with an opening 7ᵇ between said notches. When the two sections of the shaft 7 are employed, the openings 7ᵇ are in alinement so as to receive a tooth 8 and the notches 7ª correspond or register with each other so as to engage a tooth 9 at its opposite sides. The teeth 8 and 9 are formed centrally of their ends with many sided shoulder portions 10 adapted to fit snugly in the hollow portion of the shaft 7 and to thereby so interlock the teeth with the shaft as to prevent lengthwise displacement, or any play, of the teeth with respect to the shaft. Any number of the teeth 8 and 9 may be employed and the teeth of each pair are arranged at substantially a right angle, as shown most clearly in the drawings.

The revolving toothed members of the harrow having been described, the means for controlling the operation of these members with respect to the soil will now be set forth.

Mounted upon a transverse shaft 11 adjacent to the rear end of the implement is a lever 12 having the usual segment and hand operated catch 13 and 14 associated therewith for locking it in an adjusted position. Arms 15 project upwardly from the opposite ends of the shaft and said arms are connected by links 16 with shifting bars 17. The bars 17 are arranged longitudinally of the implement approximately above the sides of the frame 1 and said bars are connected with levers 18 pivoted to trunnions 19 on opposite sides of each side of the frame 1. The levers 18 carry the springs 20, the latter virtually constituting a flexible or yielding arm of each lever.

The preferred construction of the levers 18 is shown more clearly in Fig. 8 of the drawings, each lever comprising a bar bent between its ends so as to give the lever a U-form and said bar being further bent to provide pivot loops 21 from which the spring 20 projects, said spring constituting terminals of the bar and therefore being comprised of spaced elements arranged on opposite sides of the adjacent side of the frame 1.

By reason of the mounting of the levers 18, and the fact that the springs 20 have a slidable connection with the boxes 5, by passing through loops 22 on said boxes, it will be apparent that by movement of the main lever 12, the various levers 18 connected to the bars 17 and located at opposite sides of the frame may be adjusted. By changes in the adjustments of the levers 18, they are adapted to correspondingly adjust the tension of the springs 20. Since the springs 20 engage with the boxes 5 and are adapted to yieldingly support said boxes at predetermined adjustments, it will be apparent that the action of the toothed members of the harrow upon the soil may be nicely regulated in order to accommodate for various conditions of the latter. The degree of penetration of the teeth 8 and 9, as well as the action of said teeth for breaking up clods, etc., may be regulated at the will of the operator and as necessary under different conditions of service. The levers 18 under the control of the main lever 12 are adapted to be operated to lift the boxes 5 sufficiently to raise the shaft 7 to occupy positions wherein the teeth of said shafts will not operate upon the soil. The springs 20, in view of the foregoing, constitute members adapted to impart a positive movement to the toothed members of the harrow to govern the action of the latter on the soil and they furthermore afford yielding means for holding the toothed members in yielding engagement with the ground.

The above arrangement and construction of parts is especially advantageous in horrowing stony ground, by reason of the yieldability of the harrow teeth and the ease with which the action of said teeth may be controlled.

In Figs. 7 to 10, inclusive, a slightly different construction of parts is employed, the frame 25 having a suitable seat 26 thereon and an operating lever 27 being located in advance of the seat convenient for actuation by the operator. The lever 27 is supported on the rock shaft 28 which has the arms 29 connected by links 30 with the bars 31 that operate levers 32 which have the springs 33. The majority of the parts above referred to are found either in exactly the same or equivalent form in the preferable construction of the invention. In the modification, the shafts 34 which carry the teeth 35 and 35' are split or sectional, as before, but preferably are of square form in cross section. The ends of the sections of each shaft 34 are solid and formed to provide spindles 34', the body of the shaft being hollow. The teeth 35 and 35' are mounted on the shaft 34 in a manner substantially the same as the teeth 8 and 9 are mounted on the shaft 7. The boxes 36 in which the shaft 34 is journaled are engaged by the springs 33 and have screw caps 37 applied thereto at the outer extremities of the same. Exteriorly, the boxes 36 are provided with intermediate square portions 36' fitting snugly in the bearings 37 of the frame 25 and adapted to slide in said bearings in an obvious manner, for adjustment purposes. An enlarged portion of each box at its inner end and a cap 37 at the outer end of said box, being on opposite sides of a side of the frame 25 prevent any longitudinal movement or displacement of the shafts 34.

Under certain conditions, should it be desired to dispense with the yielding members coöperating with the shafts 7 and 34, said shafts will be positioned with their boxes at the upper ends of the bearings 4 and 37, respectively, and the weight of the frame of the implement would, under such conditions be carried by the toothed members of the harrow when the latter operate in the ground. The parts may be so arranged, however, that the weight of the frame is not necessarily entirely sustained by the toothed members.

Having thus described the invention, what is claimed as new is:

1. In a revolving harrow, the combination of a frame, toothed members mounted for vertical movement in said frame, springs connected at one end to the members aforesaid to yieldingly support the same, levers mounted on the frame and connected to the other end of the springs, and means connected to the levers and operable to adjust the yieldability of the toothed members and simultaneously shift the position of the same.

2. In a revolving harrow, the combination of a frame, toothed members mounted thereon for rotation, springs slidably connected with said members and yieldably holding the same in predetermined positions, and means connected with the various springs for moving the same to vary their tension and for positively actuating the toothed members.

3. In a revolving harrow, the combination of rotating toothed members, springs slidably connected with said members to permit yielding action of the same, and means for simultaneously adjusting the tension of the springs and throwing the toothed members toward and from the ground.

4. In a revolving harrow, the combination of a frame, shafts, boxes slidably mounted on the frame and having the shafts journaled therein, springs slidably connected with the boxes, and levers connected to the springs whereby movement may be imparted to the boxes through the springs carried by the shafts aforesaid.

5. In a revolving harrow, the combination of a frame composed of sides, split boxes mounted on said sides, a split shaft mounted in said boxes, teeth carried by said shaft, shoulders on the shaft interlocking with the boxes to prevent longitudinal movement of the shaft, and shoulders on the teeth adapted to hold the latter in position on the shaft.

In testimony whereof I affix my signature in presence of two witnesses.

NILS IVERSON.

Witnesses:
M. V. STEADMAN,
H. C. ROBB.

---

Copies of this patent may be obtained for five cents each, by addressing the "Commissioner of Patents, Washington, D. C."